US011190017B1

(12) United States Patent
Rothschild et al.

(10) Patent No.: US 11,190,017 B1
(45) Date of Patent: Nov. 30, 2021

(54) SYSTEM AND METHOD FOR SMART LOCAL POWER DISTRIBUTION

(71) Applicant: Cox Communications, Inc., Atlanta, GA (US)

(72) Inventors: Keith Alan Rothschild, Dunwoody, GA (US); Ron Lev, Atlanta, GA (US); Steve Malenfant, Cumming, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 42 days.

(21) Appl. No.: 16/733,612

(22) Filed: Jan. 3, 2020

(51) Int. Cl.
*H02J 3/28* (2006.01)
*H02J 13/00* (2006.01)
*H02J 3/38* (2006.01)
*G05B 19/042* (2006.01)

(52) U.S. Cl.
CPC ............ *H02J 3/28* (2013.01); *G05B 19/042* (2013.01); *H02J 3/381* (2013.01); *H02J 13/00002* (2020.01); *G05B 2219/2639* (2013.01); *H02J 2300/24* (2020.01); *H02J 2300/28* (2020.01)

(58) Field of Classification Search
CPC .......... H02J 3/28; H02J 3/381; H02J 2300/28; H02J 2300/24; H02J 13/00002; G05B 19/042; G05B 2219/2639
See application file for complete search history.

(56) References Cited

U.S. PATENT DOCUMENTS

| 2005/0116836 A1* | 6/2005 | Perry | H04Q 9/00 340/870.02 |
| 2012/0181974 A1* | 7/2012 | Kuniyosi | H02J 13/0006 320/101 |
| 2014/0277786 A1* | 9/2014 | Forbes, Jr. | H02J 3/00 700/286 |

* cited by examiner

*Primary Examiner* — Kidest Bahta
(74) *Attorney, Agent, or Firm* — Merchant & Gould P.C.

(57) ABSTRACT

A smart local power distribution (SLPD) system is provided for improving the efficiency of local power generation and consumption. The SLPD system includes a local distribution grid connected to a regional power grid by a local power manager including a local power storage unit and further connected to a plurality of power meters. The local power storage unit is configured to store excess locally-generated power and to provide supplemental power to prosumers for minimized usage of regionally-supplied power and minimized peak-time usage of regionally-supplied power. The local power manager analyzes data provided by the power meters, generates power load and generation profiles, and makes various data-based power flow decisions corresponding to optimizing efficiency of the SLPD system.

20 Claims, 6 Drawing Sheets

SYSTEM AND METHOD FOR SMART LOCAL POWER DISTRIBUTION

BACKGROUND

Due to a variety of factors, such as storm damage, rising utility costs and environmental concerns, local power-generating devices are being increasingly installed at various premises. These devices can include solar panels, wind turbines, or other types of energy sources. Such devices can generate more power than a premises may use. Currently, excess power may be stored in a storage cell, such as a battery, at the premises or sold back to a power network.

When net metering is used, the selling of power from a premises to a power network can offset at least a portion of the power consumed by the premises during other times of the day (or week, month, year, etc.) or when local power generation is not sufficient to meet the power demand. This can reduce the amount of electricity a customer purchases from a power network. However, in some locales, net metering may be not be offered, or compensation for providing locally generated excess power back to the power network may not be a 1:1 ratio. Thus, premises owners may not receive an optimized benefit from implementing local power-generating systems. As mentioned above, when a local power-generating device produces more power than the premises can use, it may locally store the excess power. However, local storage options, such as storage batteries, are not only expensive, but also use materials that can have a detrimental impact on the environment.

Additionally, when local power-generating devices and the local storage system are unable to support the load at a premises, the premises may draw power from a generator; or, if the premises is connected to a regional grid, power from the regional grid may be used to supplement the power flow. One disadvantage of utilizing power from the regional grid is inefficiency, wherein a strain can be placed on the grid's distribution and transmission infrastructure and where energy losses may be incurred in association with transmitting voltage long distances from a regional power source. Another disadvantage is the associated cost of using a generator or purchasing power from the regional grid. Oftentimes, regional power sources implement time-of-use rates, where the cost of electricity may vary by time-of-day and time-of-year based on electricity demand. Accordingly, if a premises with a solar system produces enough power to support the demand during the off-peak hours, but doesn't produce enough power during peak hours, the premises may need to draw power from the regional grid during peak hours when the cost of power is higher. Additionally, if there is a disruption in service on the regional grid, a premises may not have access to power.

SUMMARY

Aspects of the present disclosure provide systems and methods for improving the efficiency of local power generation and consumption. According to an aspect, a smart local power distribution system is provided that enables a plurality of power producers and consumers (prosumers) connected to the smart local power distribution system to efficiently produce and consume power. The smart local power distribution system includes a local power storage unit that is configured to store excess-generated power and provide supplemental power to prosumers. Accordingly, each prosumer does not need to implement a local power storage system, which reduces the amount of resources needed for local power generation. This can reduce the cost and environmental impact of implementing a local power-generating system, which can promote the usage of local power production. Additionally, the local power distribution system allows power generation and storage to be implemented proximate to where the power is consumed, which can result in lower transmission losses.

The smart local power distribution system further includes smart power meters implemented at each prosumer unit, the local power storage unit, and at a connection point to the regional power grid that are configured to collect data associated with power generation and consumption and to communicate the collected data to a local power manager. The local power manager may monitor the collected data for determining load profiles and for making data-informed decisions based at least in part on the load profiles for increasing the efficiency of the local power distribution system. For example, the local power manager may control the flow of power to/from the local power storage unit and to/from the regional power grid to minimize costs of purchasing power and to maximize profits from selling power back to the grid. The local power manager may further analyze collected data for detecting imbalances in the system and determining corrections to balance the energy load and to minimize energy usage. The local power manager may further analyze collected data for determining inefficient energy usage at a prosumer unit and determining an optimized usage plan, which can be communicated to and implemented by a home automation system or a home energy management system to automatically control specific appliances or devices to minimize energy consumption and/or minimize energy consumption at peak usage times. For example, the efficiency of power consumption of specific devices at a prosumer unit and/or by the prosumer unit as a whole can be increased with the availability of data collected by the power meters and the data-informed decisions made by the local power manager.

The smart local power distribution system can be implemented in a locale, such as a neighborhood, community, or other multi-housing area, wherein the local power manager can enable prosumers in the locale (or a local governing body) to have more control over their own power production and usage. According to an aspect, net metering can be implemented in the smart local power distribution system, even when net metering may not be offered by the regional power grid to which the local power distribution system is connected. For example, data collected from the power meters can enable the local power manger to determine the amount of power received from the regional power grid and to determine net usage amounts for each unit based on the amount of power generated at the unit, consumed at the unit, and transmitted to the local distribution grid from the unit. When net metering is offered by the regional power grid, excess power can be transmitted back to the regional grid and prosumer units can be credited for the excess power. In some implementations, the locale as a whole may be able to benefit from bulk billing rates for the consumption of supplementary power supplied by the regional power grid.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views.

DETAILED DESCRIPTION

Figure 1:
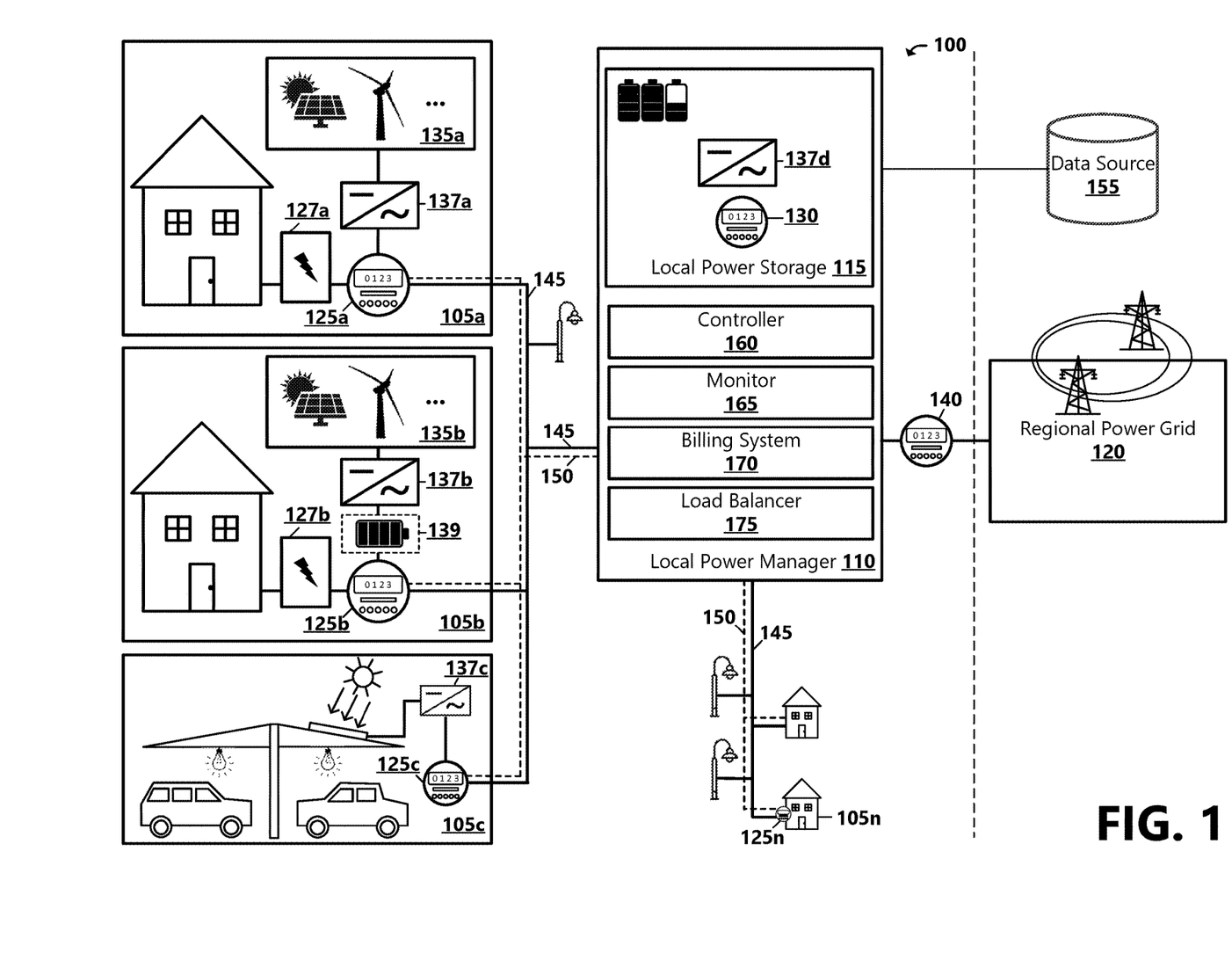
FIG. 1 is a block diagram depicting an example smart local power distribution system in accordance with an embodiment.

Aspects of the present disclosure provide a smart local power distribution system configured to provide a technical improvement to the efficiency of local power generation and consumption. FIG. 1 is a block diagram of a smart local power distribution (SLPD) system 100 that enables local management and sharing of locally-generated power according to an embodiment. As shown in FIG. 1, the SLPD system 100 includes a local distribution grid 145 managed by a local power manager 110 situated between a regional power grid 120 and a plurality of prosumer units 105a-n (generally 105) in a locale. As will be described in further detail below, the local power manager 110 is configured to provide localized management of power consumption, which can improve the efficiency of local power generation, transmission, and storage. The term 'prosumer' is used herein to describe a residential, business, or industrial producer and/or consumer of power in the SLPD system 100. That is, a prosumer unit 105 may: consume power from the local distribution grid and transmit locally-generated power to the local distribution grid 145; only consume power from the local distribution grid (e.g., does not generate power); or only generate and transmit power to the local distribution grid. The SLPD system 100 may be implemented in a locale, such as a neighborhood, district, community, or other geographically-localized grouping of prosumers 105. Example prosumers 105 may include, but are not limited to, single family dwellings, multi-family dwellings, commercial structures, community-common structures (e.g., club-houses, covered parking canopies, street lights), automobile charging stations, etc.

The regional power grid 120 is illustrative of one or more systems that operate to produce and/or supply electricity to power consumers. For example, the regional power grid 120 may include systems that produce electricity via means such as coal-fired plants, oil-fired plants, natural gas plants, nuclear plants, etc., as well as systems that produce electricity using renewable sources, such as solar, wind, hydroelectric, biomass, wave or tide generated, etc. The regional power grid 120 may further include an electrical transmission and distribution system operative to carry power generated from the power producer to power consumers. For example, in current systems, the regional power grid 120 may include a network of transmission lines, substations, transformers, etc., and is operative to transmit power from the power generation source to residential, business, and/or industrial consumers. According to aspects of the present disclosure and as illustrated in FIG. 1, the regional power grid 120 is connectively attached to the local power manager 110 by electrical transmission and distribution lines operative to carry power generated from regional power producers to the local power manager 110. The regional power grid 120 may sometimes be referred to herein as a "regional grid" or "the grid."

The local power manager 110 is illustrative of one or more software applications, modules, or computing devices operable or configured to manage the storage and distribution of locally-generated power, the consumption of regionally-supplied power, and the delivery of excess power to the regional distribution grid 120. In further aspects, the local power manager 110 may be further configured to receive and analyze power utilization data for identifying inefficiencies in the SLPD system 100 and for determining actions to be performed in order to alleviate the identified inefficiencies. The local power manager 110 may be implemented by one or more computing devices 500 discussed in greater detail in regard to FIG. 5. The computing devices include, but are not limited to: servers, desktop computers, laptops computers, tablets, smart phones, personal digital assistants, and distributed systems that are run on multiple computing devices. Although not illustrated, one of ordinary skill in the art will appreciate that various intermediary computing and networking devices may exist between the illustrated elements of the example system 100 to facilitate communications between the various enumerated elements, for example via the Internet and one or more Intranets.

As part of managing the storage and distribution of locally-generated power, the local power manager 110 may serve as an aggregation point between the regional power grid 120 and the prosumer units 105 that are connected to it. For example, rather than each prosumer unit 105 connecting directly to the regional power grid 120, each prosumer unit may be connected to the local power manager 110, which is connected to the regional power grid. As an example, a developer of a neighborhood may install the local power manager 110 in the neighborhood for providing localized management of power to the residences and other facilities within the neighborhood. As another example, the local power manager 110 may be installed in an existing neighborhood and connected to one or more prosumer unit 105 within the existing neighborhood. In some examples, the local power manager 110 can be implemented in an industrial, commercial, or agricultural setting, where multiple prosumer units 105 may be part of a single business entity or distinct business entities.

According to an aspect, the local power manager 110 includes a local power storage 115. A local distribution grid 145 is illustrative of electrical transmission lines that connect the local power manager 110 to the various prosumer units 105 in a locale and to the local power storage 115. In example aspects, the local distribution grid 145 is comprised of underground electrical lines. The local power manager 110, the various prosumer units 105, and the local power storage 115 are further connected to an information network 150, which may be comprised of the Internet, an intranet, an extranet, local-area networks, wide-area networks, fiber-coax networks, public switched telephone networks, global telephone networks, wired networks, wireless networks, and combinations thereof. In example aspects, a service provider, such as a telecommunications and/or broadband communications service provider, may provide the local power manager 110, and may run electrical lines as well as communication cables underground between the local power manager and the prosumer units 105 within the locale. Undergrounding electrical lines and communications cables provides various benefits. For example, in addition to improving the aesthetics of the locale, other advantages include reducing the risk of damage from severe weather conditions, reducing the risk of fire due to hot arcs caused by vegetation-to-conductor, conductor-to-conductor, or conductor-to-ground contact, reducing maintenance costs, and preventing the cutting of trees due to proximity to overhead lines, which conveys environmental benefits and can increase property values.

According to an aspect, each prosumer unit 105 may include a meter 125*a-n* (generally, prosumer meter 125) installed between a service panel 127*a-n* (generally 127) at the prosumer unit and the local distribution grid 145. The service panel 127 may be configured to receive power from the local distribution grid 145 and to distribute the power to various circuits that supply the various loads (e.g., lights, outlets, appliances, and other devices) throughout the prosumer unit 105. The prosumer meter 125 installed at a prosumer unit 105 is operative or configured to measure the amount of electric energy consumed by electrically-powered appliances and devices at each prosumer unit. In example aspects, the prosumer meters 125 are smart meters that measure and transmit prosumer unit load data to the local power manager 110. In addition to measuring energy used, the prosumer meters 125 may also record other parameters of the load and supply such as instantaneous and maximum rate of usage demands, voltages, power factor and reactive power used, etc. Each prosumer meter 125 may comprise a power supply, a metering engine, a processing and communication engine (i.e. a microcontroller), and other modules such as a display, communication ports/modules, and a real-time-clock (RTC). In some examples, a prosumer meter 125 may be implemented as a system on a chip (SoC). According to an aspect, the prosumer meters 125 are configured to communicate energy readings to the local power manager 110. Various interfaces or protocols may be used for meter communications. Communications between the prosumer meter 125 and the local power manager 110 may be via the information network 150 or via the electric service wires (local distribution grid 145). For example, communications may be wireless (e.g., using cellular, Wi-Fi, wireless ad hoc networks over Wi-Fi, wireless mesh networks, low power long range wireless, low power load data rate wireless, or smart utility network technologies) or may be transmitted via fixed wired connections, such as power line carrier connections. In some examples, the prosumer meter 125 may be configured to interface a home modem for communication of recorded data. Other connectivity technologies are possible and are within the scope of the present disclosure. In some examples, a prosumer meter 125 is configured to communicate with one or more smart devices at a prosumer unit 105. For example, smart devices may include appliances or other devices that may measure energy usage of the particular smart device and communicate the measured data to the prosumer meter 125.

In some example aspects, the prosumer meters 125 may include a nonintrusive load monitoring (NILM) component operative or configured to analyze changes in the voltage and current being consumed at a prosumer unit 105 for determining what types of appliances or devices are used and their individual energy consumption. A prosumer meter 125 may use NILM technology to collect power draw data and analyze the energy profile of the electric power that flows into the prosumer unit 105 to reveal the energy consumed by specific individual loads (e.g., appliances or devices) within the prosumer unit. For example, electricity-using appliances and devices may have a distinct power consumption signature that can be extracted from the whole-prosumer unit load data. By parsing out individual components such as air conditioners, hot water heaters, dishwashers, refrigerators, electric vehicles, and other loads, NILM can be used to disaggregate smart meter data (e.g., load) into its respective appliance consumption profiles. The resulting data may include total energy consumed per appliance/device as well as date/time date for each device or use. NILM can be used to generate and provide feedback to the local power manager 110 corresponding to energy usage and energy usage patterns of individual appliances. As will be described in further detail below, this feedback can be used by the local power manager 110 to balance electric loads within the locale, as well as to make community-based energy consumption decisions. In some example aspects, a prosumer meter 125 may record and transmit data (e.g., changes in the voltage and current being consumed at the prosumer unit 105) to an NILM component implemented at the local power manager 110. For example, the NILM component implemented at the local power manager 110 may analyze the changes in the voltage and current being consumed at the plurality of prosumer units 105 connected to the local power manager 110 for determining particular appliances or devices that are used, their individual energy consumption, and for determining patterns of energy consumption and generation.

A power-generating device 135 may include or be connected to an inverter 137*a-n* (generally 137) operative or configured to convert the electricity produced by the local power-generating device from direct current (DC) to alternating current (AC) that can be utilized by power-consuming appliances and devices at the prosumer unit or for export to the local distribution grid 145. For example, the inverter 137 may be connected to the prosumer meter 125, to the service panel 127, and to the local distribution grid 145. In example aspects, the inverter 137 may be communicatively connected to the prosumer meter 125 and to the local power manager 110, and may be configured to receive instructions from the local power manager.

According to an aspect, the prosumer meter 125 and/or the inverter 137 may include or be connectively attached to a control unit operative or configured to switch power delivery to the prosumer unit between a local power-generating device 135 and the local distribution grid 145. In some implementations, the control unit may switch the power delivery source based on instructions received from the local power manager 110. The control unit may be further operative or configured to switch power delivery from the prosumer unit to the local distribution grid 145. For example, one or more of the plurality of prosumer units 105 connected to the local power manager 110 includes one or more local power-generating devices 135*a-n* (generally 135) that are configured to use a source of energy (oftentimes a renewable source of energy) to generate electricity. Some example local power-generating devices 135 include, but are not limited to: wind turbines and solar panels. In some examples, an electric car may be implemented as a local power-generating device 135. Other types of local power-generating devices 135 are possible and are within the scope of the present disclosure.

Energy generated by a local power-generating device 135 at a prosumer unit 105 may be used by power-consuming appliances and devices at the prosumer unit 105. At various times, the local power-generating devices 135 at a prosumer unit 105 may generate more electricity than is needed. In some examples, a prosumer unit 105 may optionally comprise an energy storage device 139 where excess electricity generated at the prosumer unit may be stored for later usage. The energy storage device 139 may be integrated with a local power-generating device 135 or inverter 137. According to an aspect, when a local power-generating device 135 produces more electricity than is currently needed at a prosumer unit 105, the inverter 137 may be configured to store the excess power in the energy storage device 139; or, if the energy storage device 139 is fully charged or based on instructions received from the local power manager 110, the inverter 137 may be configured to transmit the excess power to the local distribution grid 145 for usage elsewhere in the locale or to be stored in the local power storage 115 for later usage. At various times, the local power-generating devices 135 at a prosumer unit 105 may not generate a sufficient output for supporting a load. For example, when solar output drops or a load increases beyond solar output handling capability, the inverter 137 may be further configured to connect the load to the local distribution grid 145 for supplemental power. According to an aspect, the inverter 137 may be configured to receive instructions from the local power manager 110 for directing the flow and/or supply of power to/from the prosumer unit 105.

According to an aspect, the prosumer meter 125 is further operative or configured to measure the amount of excess electricity transmitted from a prosumer unit 105 to the local distribution grid 145. For example, the prosumer meter 125 may be a bidirectional meter configured to measure both the energy fed to the prosumer unit through the local distribution grid 145 and the excess energy generated by local power-generating devices 135 at the prosumer unit 105 and fed to the local distribution grid. As will be described in further detail below, net metering may be implemented where a prosumer unit 105 may be credited for excess electricity produced at the prosumer unit and transmitted to the local distribution grid 145.

According to an aspect, excess electricity transmitted to the local distribution grid 145 may be consumed by other loads connected to the local distribution grid. For example, if a first prosumer unit 105a generates and transfers excess power to the local distribution grid 145, and if a second prosumer unit 105b connected to the local distribution grid 145 is under-producing (e.g., the local power-generating device(s) 135 at the prosumer units are not producing enough electricity power to meet the power demand of loads at the prosumer unit), the excess electricity may be consumed by the second prosumer unit 105b. According to another aspect, excess electricity transmitted to the local distribution grid 145 may be stored in the local power storage 115. In current systems, storage of excess power may be implemented at each prosumer unit 105. For example, each prosumer unit 105 may use storage cells or batteries to store excess power, which are both costly and can have a negative environmental impact due to the materials needed to implement them. The local power storage 115 of the present disclosure is shared by a network of prosumer units 105, which requires fewer resources and provides an efficient and environmentally cleaner way to store excess locally generated power for use by the network of prosumer units 105 or for later use when local power generation is low or when local power demand is high. In an example aspect, the local power storage 115 may comprise a collection of chemical energy storage devices such as batteries, or may be an alternative energy storage device such as flywheel kinetic energy storage device. Other types of local power storage 115 devices are possible and are within the scope of the present disclosure.

According to an aspect, the local power storage 115 may comprise a meter (local power storage (LPS) meter 130) operative or configured to measure and communicate (to the local power manager 110) the amount of electric energy stored at the local power storage and the amount of electric energy transmitted to and from the local power storage. The LPS meter 130 may be located at the local power storage 115, at the local power manager 110, or may be located between the local power storage and the local power manager. According to an aspect, the local power storage 115 includes or is connectively attached to an inverter (LPS inverter 137d). The LPS inverter 137d may be configured to convert electricity received from the local distribution grid 145 to DC for storage in the local power storage 115 and to convert stored DC power to AC that can be transmitted to the local distribution grid. When the local power storage 115 is not fully charged, the LPS inverter 137d may be configured to connect to the local distribution grid 145 to draw power from the local distribution grid to charge. When the local power storage 115 is fully charged, the LPS inverter 137d may be configured to disconnect from the local distribution grid 145 to terminate power intake to the local power storage.

According to an aspect, the LPS inverter 137d may be configured to initiate and terminate power intake from and delivery to the local distribution grid 145 based on instructions received from the local power manager 110. For example, the local power manager 110 may instruct the LPS inverter 137d to disconnect from the local distribution grid 145 when regional power billing rates are low and/or when electricity demand in the SLPD system 100 and/or in the regional power grid 120 is low (e.g., off-peak hours), and to connect to the local distribution grid 145 when regional power billing rates are high and/or when electricity demand is high (e.g., peak hours) such that locally-generated power stored at the local power storage 115 can be used to supply local loads at one or more prosumer units 105 during high-peak times. Accordingly, this enables a reduced power consumption from the regional power grid 120 and lowers the electricity bill for each prosumer unit 105.

Moreover, by implementing the local power storage 115 that is accessible to the plurality of prosumer units 105 within the locale, costly local power storage resources at each prosumer unit 105 can be reduced or eliminated. Additionally, the local power storage 115 provides advantages to the prosumer unit 105 connected to it by providing backup power in the event of a power outage in the area and provides energy users more flexibility in the way that they generate and use electricity, particularly electricity sourced from renewable resources such as solar and wind. Moreover, providing power to prosumer units 105 in the locale using power generated locally and stored locally in the local power storage 115 may be more efficient than transmitting power from the regional power grid 120. For example, the locally-generated power is stored and consumed proximate to where the power is generated, which reduces the travel distances of electricity and the loss of electricity due to the transmission and distribution of the electricity over long distances.

According to an aspect, the local power manager 110 may comprise or be connected to a regional power grid (RPG) meter 140 operative or configured to measure the amount of electric energy drawn from the regional power grid 120 to supply supplementary power to the plurality of prosumer units 105. According to another aspect, when the local power-generating devices 135 in the locale produce more electricity than is currently needed at the plurality of prosumer units 105 and if the local power storage 115 is fully charged, this excess electricity may be transmitted to the regional power grid 120 for utilization in other locales. According to an aspect, the RPG meter 140 is further operative or configured to measure the amount of excess electricity transmitted from the locale to the regional power grid 120. For example, the RPG meter 140 may be a bidirectional meter configured to measure both the energy fed to the local power manager 110 for distribution to the plurality of prosumer units 105 and the excess energy generated by local power-generating devices 135 at the plurality of prosumer units 105 and fed to the regional power grid 120.

With continued reference to FIG. 1, various components of an example local power manager 110 are illustrated. In example aspects, the local power manager 110 includes a monitor 165 component illustrative of a software application, module, or computing device operable or configured to monitor and track the amount of power delivered to and received from a prosumer unit 105 (e.g., based on readings from the prosumer meter 125), the amount of power stored at the local power storage and the amount of power transmitted to and from the local power storage 115 (e.g., based on readings from the LPS meter 130), and the amount of power transmitted to and from the regional power grid (e.g., based on readings from the RPG meter 140).

According to an aspect, the monitor 165 may be further configured to generate load profiles for each prosumer unit 105 and for the SLPD system 100 as a whole. For example, data received from the plurality of prosumer meters 125 may be analyzed for determining individual energy consumption of certain appliances and/or devices at a particular prosumer unit 105. The monitor 165 (or in some implementations, an NILM-equipped prosumer meter 125) may use an NILM algorithm to analyze the power consumption at the prosumer unit 105, detect operational states (e.g., oft on, multi-state mode) of appliances/devices, determine different features of power measurements (e.g., steady-state durations, current spikes), and to determine which appliances/devices are running, when each of the appliances/devices are running, and the amount of energy consumed by each appliance/device. Accordingly, a load profile of each prosumer unit 105 can be generated. A load profile may include values representative of a variation of electrical power load amounts over a time period. Additionally, a power generation profile of each prosumer unit 105 and for the SLPD system 100 as a whole can be generated based on power generation readings transmitted from local power-generation devices 135 and/or inverters 137. For example, a power generation profile may include values representative of a variation of electrical power generation amounts over a time period.

According to an aspect, the monitor 165 is be further configured to analyze load and generation profiles for learning patterns of usage and generation. For example, load and generation profiles may reveal low and high load periods and low and high generation periods and a time-based distribution of utilization and excess power generation throughout the SLPD system 100. The local power manager 110 may be configured to use load and generation profiles as part of making data-driven decisions associated with load balancing, power factor correction, local power usage and storage, and regional power grid 120 usage and output to the regional power grid.

According to another example aspect, load profile and generation profile information can be communicated to the prosumer meter 125, to a home automation system, a home energy management system, or to another application or service to generate a display of the consumption and/or generation information to a prosumer user. Power consumption and power generation information may inform the prosumer user about what appliances/devices are running and how much power these appliances/devices consume. For example, this information can enable the prosumer user to make informed decisions about conserving power. As another example, load profile information can be communicated back to a home automation system, home power management system, or other service for enabling the system/service to schedule certain loads at a prosumer unit 105 to operate at certain times to operate more efficiently (e.g., to reduce amount of power used, reduce amount of regional power used, reduce costs).

In some examples, load profile and generation profile information can be communicated to an entity associated with the locale, such as a homeowners association, for enabling the entity to make decisions for the operation of shared locale resources that increase the efficiency of power distribution and usage in the SLPD system 100 based on the usage profiles. In other examples, load profile and generation profile information can be communicated to an automation system or energy management system associated with the locale that may manage the scheduling of loads in the locale for increased efficiency.

According to an aspect, the local power manager 110 may include a controller 160 illustrative of a software application, module, or computing device operable or configured to: control a flow of power from the local power storage 115 to the local distribution grid 145, control a flow of power from the regional power grid 120 to the local distribution grid, control a flow of excess power generated by a local power-generating device at a prosumer unit 105 to the local power storage; and control a flow of excess power generated by a local power-generating device to the regional power grid. In some example aspects, the controller 160 is configured to send instructions to the prosumer control unit (e.g., implemented in the prosumer meter 125 and/or the inverter 137) to control the supply of electric power to or from a prosumer unit 105 based on various factors. In some examples, when a load at the prosumer unit 105 draws current, and if the local power source 135 at the prosumer unit is not producing sufficient power output to support the load, the inverter 137 may connect the prosumer unit 105 to the local distribution grid 145 to supplement the prosumer unit 105 with excess locally-generated power transmitted to the local distribution grid 145 from another prosumer unit 105, excess locally-generated power stored in the local power storage 115, or regional power supplied from the regional power grid 120. In some examples, the prosumer meter 125 may generate and send a draw detection signal to the local power manager 110.

The controller 160 may be configured to receive the current draw signal from the prosumer meter 125 and determine whether to supply power to the local distribution grid 145 from the local power storage 115. The determination may be based on one or more of: the charge level of the local power storage 115, whether there is sufficient power on the local distribution grid 145 provided by other local power-generating devices 135 that are producing and supplying excess power to the local distribution grid, whether it is a peak (billing) period for the regional power grid 120 (e.g., when power consumption is high and locally-generated power production is low), load profiles, or other criteria. According to an aspect, the local power manager 110 may be in communication with a data source 155 associated with the regional power grid 120 that is configured to provide billing rates and buy-back rates associated with the regional power grid. The controller 160 may use one or more algorithms to determine whether to supply power from the local power storage 115 to the local distribution grid 145. For example, the one or more algorithms may be configured to make power flow decisions to optimize efficiency of the local distribution grid 145, which may include one or more of: minimizing the amount of power drawn from the regional power grid 120, minimizing power drawn from the regional power grid 120 during peak periods, maximizing power supplied to (e.g., sold to) the regional power grid 120 during high/peak-demand periods, minimizing costs for the prosumer units 105, etc. As an example, if there is not sufficient excess power being supplied to the local distribution grid 145 by other prosumer units, if the local power storage 115 has a sufficient charge (e.g., according to a predetermined charge threshold), and if it is during a peak period (e.g., regional power grid 120 peak period and/or SLPD system 100 peak period determined based on load profiles), the controller 160 may be configured to send instructions to the LPS inverter 137d to connect to the local distribution grid 145 to provide power to the local distribution grid for supplying power to the prosumer unit 105. As another example, if there is not sufficient power being generated and provided by local power-generating devices 135, if the local power storage 115 does not have a sufficient charge level, and/or if it is an off-peak period (e.g., regional power grid 120 off-peak period and/or SLPD system 100 off-peak period determined based on load profiles), the controller 160 may be configured to control the flow of power from the regional power grid 120 to supply power to the prosumer unit 105.

As mentioned above, the controller 160 may be configured to initiate and terminate power delivery to the local distribution grid 145 from the regional power grid 120 and from the local distribution grid to the regional power grid based on data-informed decisions. For example, when the consumption of electricity at a prosumer unit 105 is greater than the amount of electricity available from local power-generating devices 135 at the prosumer unit or from excess electricity stored in the local power storage 115 or provided from other local power-generating devices in the locale, the controller 160 may make a determination to supply electricity from the regional power grid 120 to the local distribution grid 145 for distributing to the prosumer unit.

According to another aspect, the controller 160 may be configured to connect/disconnect the local distribution grid 145 to/from the regional power grid 120 based on other factors or criteria, such as based on certain time periods, billing rates, buy-back rates, load profiles, etc. For example, to avoid demand charges and peak time-of-use rates, the controller 160 may determine a peak period (e.g., times of high power consumption and low local power-generation) and may disconnect from the regional power grid 120 during the peak period. In some examples, the local power manager 110 may be configured to receive up-to-date billing and buy-back rates of the regional power grid from a data source. Peak and off-peak periods may be based on the regional power grid 120 billing/buy-back rates or a combination of the regional power grid billing/buy-back rates and load/generation profiles of the SLPD system 100. As an example, if a prosumer unit 105 has a load during a peak period that its local power-generating devices 135 cannot support, the prosumer unit 105 may draw supplemental locally-generated power from the local power storage 115. The controller 160 may initiate a draw of power from the regional power grid 120 during a peak period when local power-generating devices 135 nor the local power storage 115 can support the demand. In some examples, the local power manager 110 may initiate a draw of power from the regional power grid 120 during off-peak times to store in the local power storage 115 and/or to supplement loads on the local distribution grid 145 to conserve the locally-generated power for usage during peak periods. For example, when the local power storage 115 charge is low and the cost of electricity from the regional power grid 120 is low, the controller 160 may make a determination to control the flow of power from the regional power grid 120 to the local power storage 115 to store low-cost electricity from the grid for use (at one or more prosumer units 105) during peak-demand times when the cost is higher.

The controller 160 may be further operative or configured to control the amount of electric power delivered to the regional power grid 120 from the local distribution grid 145. For example, if the local power storage 115 is fully charged (e.g., based on readings from the LPS meter 130) and the amount of excess power supplied to the local distribution grid 145 by local power-generating devices 135 is higher than the current demand for power on the local distribution grid, the controller 160 may connect to the regional power grid 120 to transmit the excess power to the regional power grid. According to another example, the controller 160 may determine whether to transmit excess power to the regional power grid 120 based on buy-back rates (e.g., associated with the regional power grid). For example, based on usage and generation profiles and regional grid buy-back rates, the controller 160 may determine that local power-generating devices 135 in the local distribution grid and the amount of power stored in the local power storage 115 are likely sufficient for supplying power in the local distribution grid 145 for a time period when excess power can be transmitted to the regional power grid 120 for a higher buy-back rate to maximize compensation for excess locally-generated power.

According to an aspect, the monitor 165 may be in communication with a billing system 170 included in the local power manager 110. The billing system 170 is operative or configured to determine, based on information provided by the monitor 165, a net power consumption amount for each prosumer unit 105 and a corresponding local billing amount and local buy-back amount for the net consumption amount for a billing period. A billing amount for the net power consumption may be based on: amounts of power delivered to the prosumer unit 105 from the local distribution grid 145 and local billing rates for the usage based on time (e.g., local peak periods and off-peak periods) and amounts of excess power generated by local power-generating devices 135 at the prosumer unit 105 and delivered to the local distribution grid 145 and local buy-back rates for the excess power based on time (e.g., local peak periods and off-peak periods). The billing amount may be further based on amounts of supplemental power delivered to the local distribution grid 145 from the regional power grid 120 and a regional billing rate for the usage based on time (e.g., regional peak periods and off-peak periods) and amount of excess power generated by local power-generating devices 135 in the SLPD system 100 and delivered to the regional power grid 120 and regional buy-back rates for the excess power based on time (e.g., regional peak periods and off-peak periods).

According to an example aspect, the local power manager 110 may operate as a customer of the regional power grid 120 and may be billed by the regional power grid for the net power consumption of regional power (e.g., [amount of regional power received]−[amount of locally-generated power delivered to the regional grid]). The local power manager 110 may further determine billing amounts for the prosumer units 105 connected to the local distribution grid 145 to compensate for the billed amount for power provided by the regional power grid 120 and for shared costs amongst the prosumer units for shared-community resources (e.g., power used for support of the shared-community resources). In some examples, various multipliers may be applied to amounts of power received from or delivered to the prosumer unit 105 based on various factors, such as peak periods, off-peak periods, peak usage amounts, etc. For example, a prosumer unit 105 may be charged more for power delivered to the prosumer unit from the local distribution grid 145 during a peak period (e.g., peak period associated with the SLPD system 100 and/or the regional power grid 120) than an off-peak period. As another example, the prosumer unit 105 may be compensated less for power transferred to the local distribution grid 145 during a peak period (e.g., peak period associated with the SLPD system 100 and/or the regional power grid 120) than an off-peak period. In an example aspect, if the local power manager 110 is provided by a telecommunications or broadband communications service provider, the determined billing amounts may be included in a combined power and communications bill.

Figure 2:
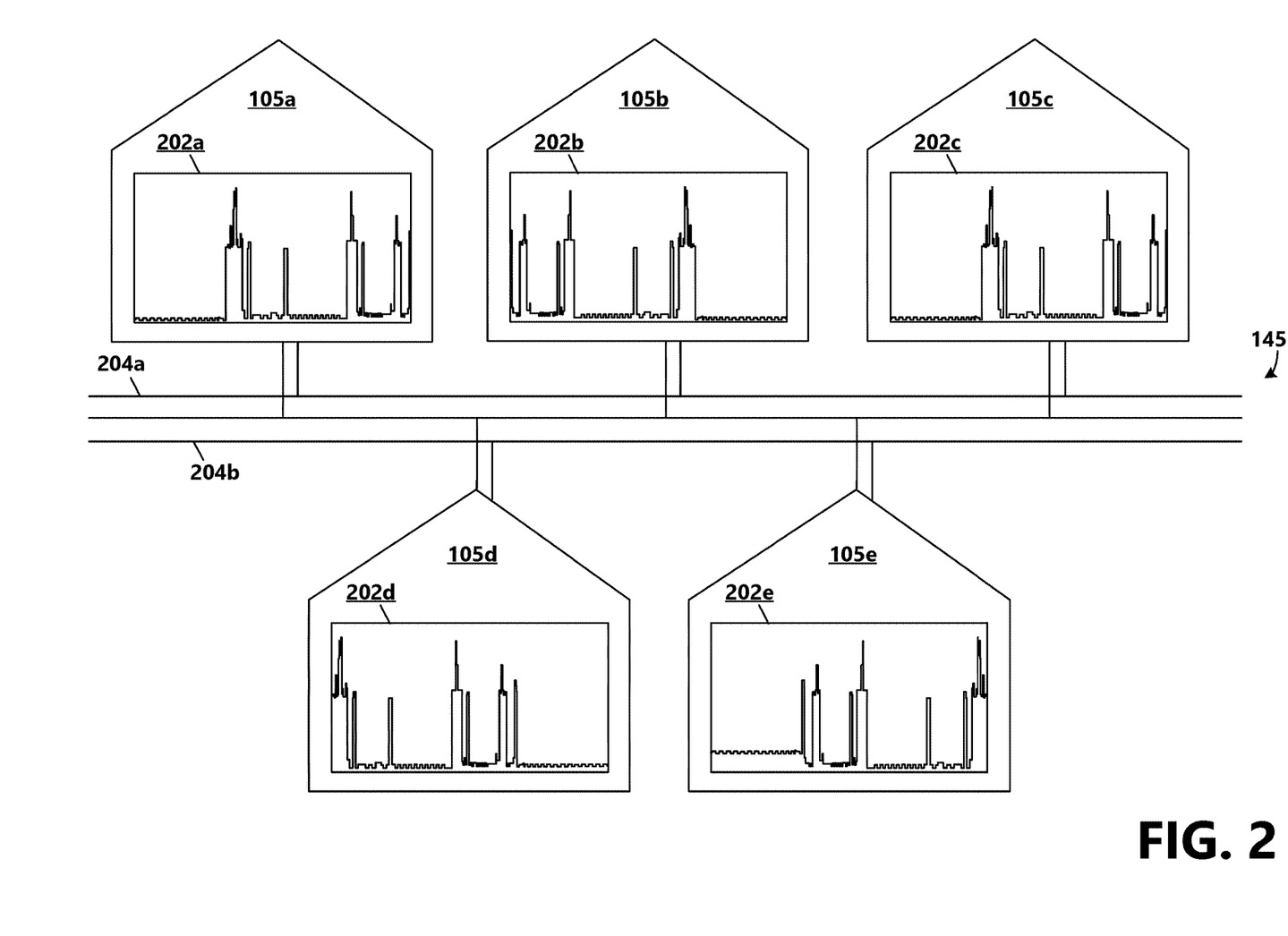
FIG. 2 is a block diagram showing example load profiles of a plurality of prosumers in the smart local power distribution system that can be used for determining inefficiencies and corrective actions.

According to an aspect and with reference now to FIG. 2, the monitor 165 may be further configured to analyze power load and generation profiles for identifying inefficiencies in the local distribution grid 145 and/or at one or more prosumer units 105. FIG. 2 shows example power load and/or generation profiles 202a-e (generally 202) generated by the monitor 165. The example power load and/or generation profiles 202 may reveal patterns of power usage and generation of individual prosumer units 105 over a time period. The power load and/or generation profiles 202 can be analyzed for identifying sources of inefficiencies, such as load imbalances in the local distribution grid 145. For example, an analysis of readings provided by prosumer units 105 (e.g., via the prosumer meters 125, inverters 137), the monitor 165 may be configured to determine if loads may be evenly and reasonably distributed among the phases 204a,b of the local distribution grid 145. According to an aspect, voltage readings may indicate that there may be a regularly-occurring imbalance in the local distribution grid 145 at a particular time of day when the load on a first phase 204a may be higher than a second phase 204b by a particular threshold amount indicative of an imbalance. For example, the threshold amount may be associated with adverse effects of unbalanced distortion on the local power distribution grid 145. An analysis of power load profiles 202 may reveal that power usage patterns of two particular prosumer units 105a,c located on the first phase 204a are significantly higher at the particular time. By analyzing the load profiles 202 of other prosumer units 105 in the local distribution grid 145, an optimized configuration may be determined where the loads on the two phases 204 are more evenly-balanced throughout the day.

The monitor 165 may be further configured to determine a configuration of the local distribution grid 145 for optimizing efficiencies based on identified imbalances and/or load profiles. For example, the determined configuration may minimize the unbalancing and reduce the current in the neutral wire of the system. For example, a determination may be made that by switching one or more prosumer units 105 to another phase 204, the local distribution grid 145 may be better balanced and efficiency within the SLPD system 100 may be optimized. The local power manager 110 may be configured to perform an action based on the identified imbalance and/or determined optimal configuration. In some examples, the local power manager 110 may notify the service provider so that the service provider can take an action on the determined information. For example, based on power load profiles, the service provider may select to reconfigure the local distribution grid 145 to balance loads and improve the efficiency of the local grid.

Figure 3:
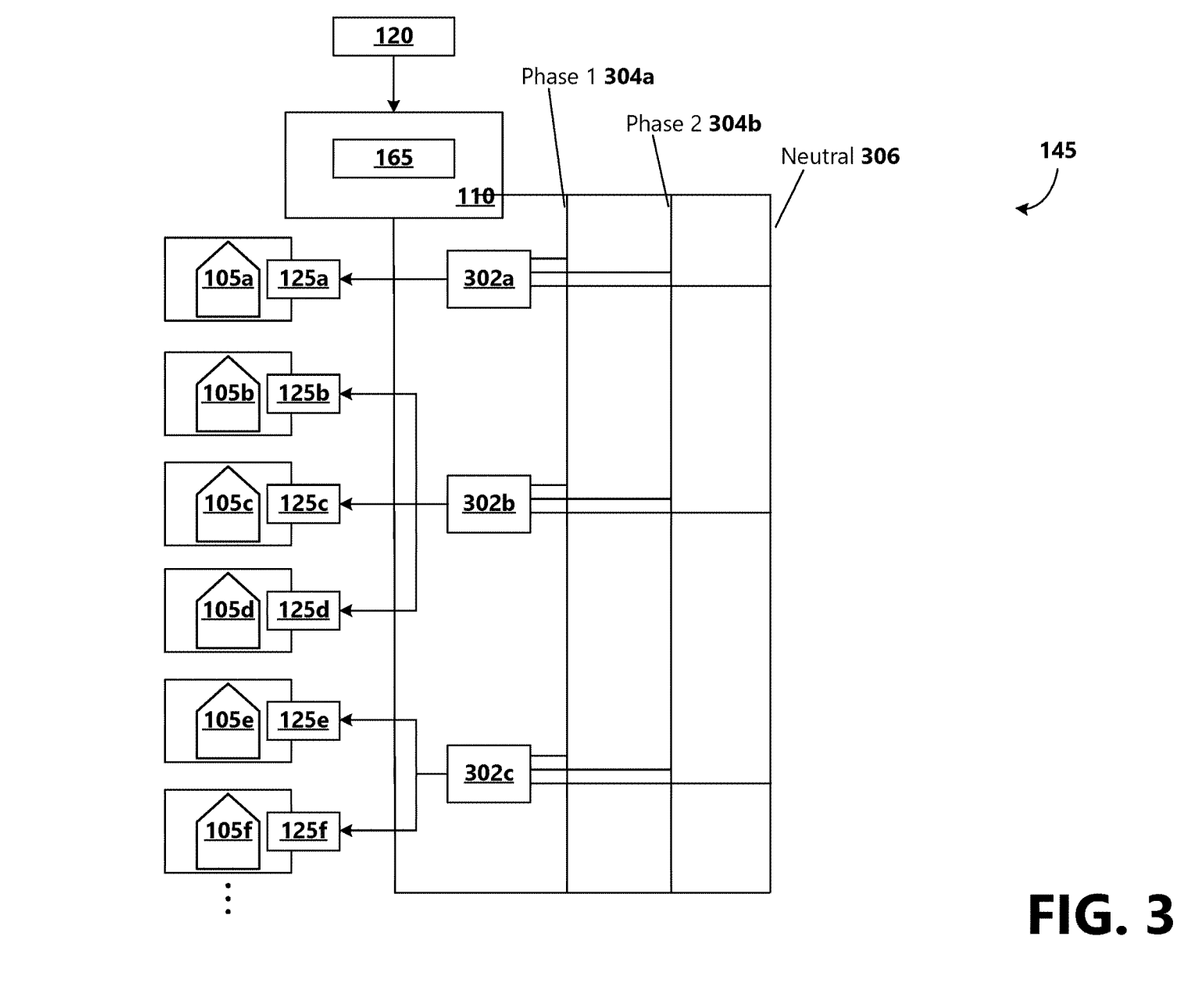
FIG. 3 is a block diagram of an example smart local power distribution system including a plurality of load balancers.

In some implementations, the monitor 165 may use one or more algorithms that identify unbalanced loads in the local distribution grid 145 and that further identify a load switching selection that may correct the imbalance in real-time or near real-time. An imbalance or a degree of imbalance may be determined based on one or more predetermined thresholds. According to an example aspect and as illustrated in FIG. 3, the local power manager 110 may include or be connectively attached to one or more load balancers 302a-n configured as load switching devices that may be used to perform phase-load balancing, wherein a load balancer may automatically switch a particular prosumer unit 105 or group of prosumer units from one phase 304a,b (generally 304) to another phase. In some examples, a load balancer 302a may be connected to a line that feeds one prosumer unit 105a. In other examples, a load balancer 302b,c may be connected to a line that feeds a plurality of prosumer units 105b,c,d, 105e,f.

In an example scenario, a first group of prosumer units 105a-d may each be connected to a first phase 304a. As illustrated and according to an aspect, a first prosumer unit 105 in the first group of prosumer units 105a-d may be connected to the first phase 304a through a first load balancer 302a and the other prosumer units 105b-d in the first group may be connected to the first phase through a second load balancer 302b. Further, a second group of prosumer units 105e,f may be connected to a second phase 304b via a third load balancer 302c. The monitor 165 of the local power manager 110 may analyze appliance/device consumption data received from the prosumer meters 125a-f and determine that the loads on the first and second phases 302a,b are unbalanced. In some implementations, a load switching selection may be made based on a least-loaded phase feeder line 304 (e.g., a prosumer unit 105 on an overloaded phase may be switched to another phase that has the least load). In other implementations, a load switching selection may be made based on results of an algorithm configured to determine an optimized configuration that may minimize current and load consumption and bring voltage and load to a near-equilibrium state in the local distribution grid 145. For example, a determination may be made that the first phase 304a may be overloaded and that the imbalance may be corrected by switching the first prosumer unit 105a to the second phase 304b, which has a lower load level. Accordingly, the first load balancer 302a may receive instructions from the monitor 165 to switch the first prosumer unit 105a from the overloaded feeder line (first phase 304a) of the local distribution grid 145 to the second phase 304b. Accordingly, based on the instructions from the local power manager 110, the load balancer 302 is operable to optimize the configuration of loads on the phases/feeder lines 304 for balancing loads and improving the efficiency of the local distribution grid 145.

Figure 4A:
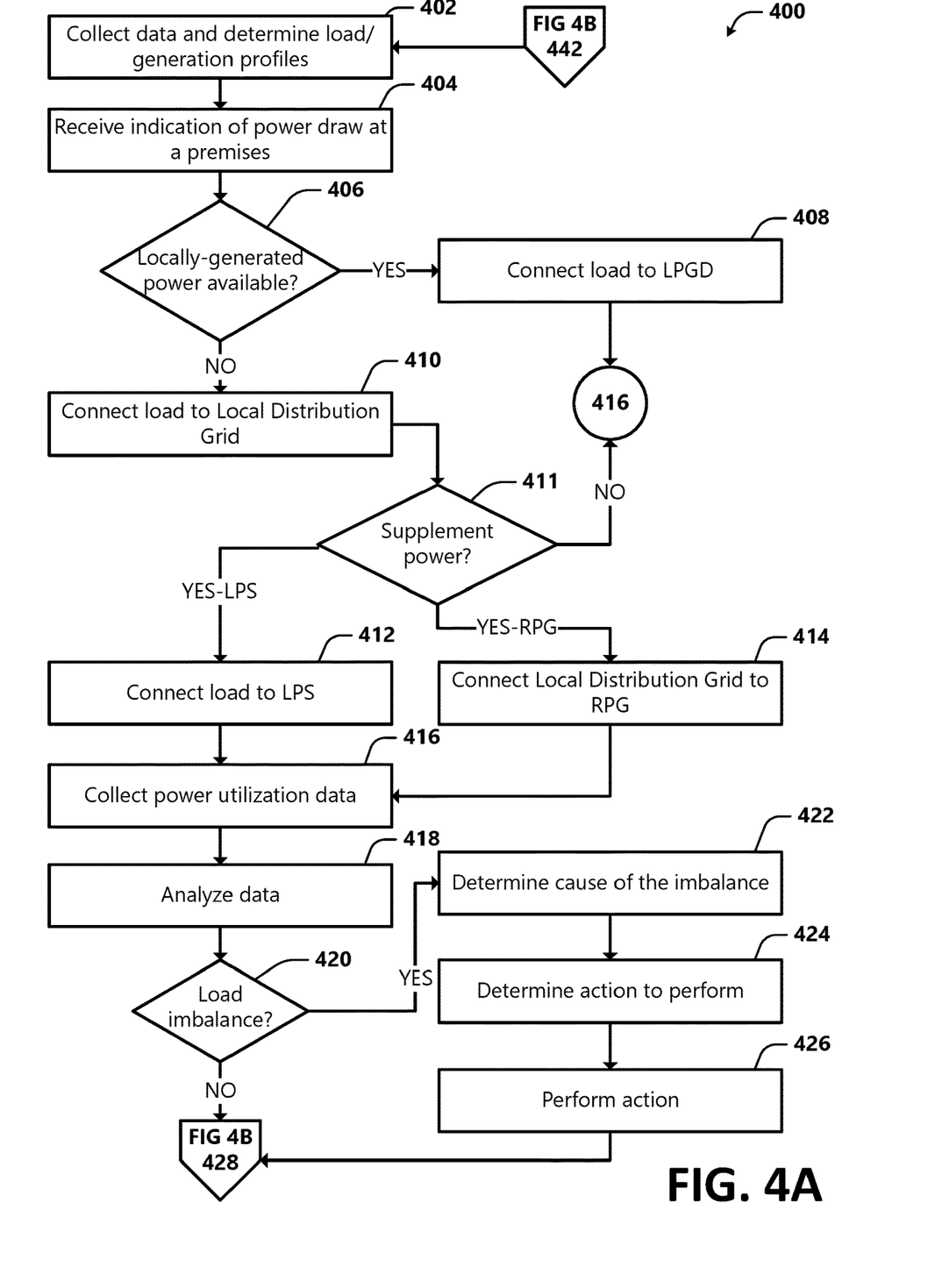
FIGS. 4A and 4B are a flow chart depicting general stages of an example process of providing a smart local power distribution system for improving the efficiency of local power generation and consumption in accordance with an embodiment.

With reference now to FIG. 4A, a flow chart depicting general stages of an example method 400 for improving the efficiency of local power generation and consumption in accordance with an embodiment is illustrated. At OPERATION 402, the method 400 starts by collecting usage and generation data from each prosumer unit 105 in the SLPD system 100 and determining load and generation profiles for each unit and for the system as a whole. According to an aspect, the load profiles may include usage information for individual loads (e.g., determined using NILM technology) at a prosumer unit 105 and/or for aggregated loads. OPERATION 402 may further include collecting billing/buy-back rates associated with the regional power grid 120.

At OPERATION 404, a load is detected at a first prosumer unit 105. For example, a power draw at the prosumer unit 105a may be associated with a power-consuming device going into an active state.

At DECISION OPERATION 406, a determination is made as to whether locally-generated power is available to supply power to the load. For example, a determination may be made as to whether one or more local power-generating devices 135 at the prosumer unit 105 may be generating an output of power that is sufficient to run at least a portion of the detected load. When the local power-generating device 135 output is sufficient, at OPERATION 408, the inverter 137 may connect to the service panel 127 for supplying the locally-generated power to the prosumer unit 105. When a determination is made that locally-generated power output is not sufficient, that the load demand has increased beyond the local power-generating device 135 capability, or based on a decision made by the local power manager 110 (e.g., based on load/generation profiles, peak/off-peak periods), the inverter 137 may connect the load to the local distribution grid 145 for enabling the load to draw the differential power from the local distribution grid 145 at OPERATION 410.

At DECISION OPERATION 411, a determination may be made as to whether supplementary power is needed to support the loads on the local distribution grid 145. For example, a determination may be made as to whether the amount of power that may be supplied to the local distribution grid 145 by local power-generating devices 135 at other prosumer units 105 in the locale is sufficient to support the load and other loads on the local grid. When a determination is made that supplemental power may be needed to support the loads (e.g., locally-generated power cannot support the loads), another determination may be made as to whether to supplement the local distribution grid 145 with locally-generated power stored at the local power storage 115 or with regional power provided by the regional power grid 120. As described above, this determination may be based on various criteria to optimize efficiency of the local distribution grid 145, wherein optimized efficiency may be associated with minimizing costs, minimizing transmission losses, maximizing utilization of locally-generated power, etc. For example, the local power manager 110 may evaluate various criteria, such as the charge level of the local power storage 115, billing rates of the regional power grid 120 (e.g., whether it is a peak period or off-peak period), consumption/generation profiles of the prosumer unit 105, consumption/generation profiles of the local distribution grid (e.g., whether the local distribution grid and/or local power storage 115 may be able to support loads during peak periods to alleviate purchasing power from the regional power grid when prices are higher), etc.

When a determination is made to supplement the local distribution grid 145 with locally-generated power stored at the local power storage 115, at OPERATION 412, the LPS inverter 137d may connect the local power storage 115 to the local distribution grid 145 and supply locally-generated power to the local grid. When a determination is made to supplement the local distribution grid 145 with regional power provided by the regional power grid 120, the local distribution grid 145 may be connected to the regional power grid 120 at OPERATION 414. When a determination is made that supplemental power is not needed at DECISION OPERATION 411 or when the local distribution grid 145 is supplemented with power from the local power storage 115 or the regional power grid 120, at OPERATION 416, power utilization data may be collected from various meters, such as the prosumer meter 125, the LPS meter 130, and/or the RPG meter 140.

At OPERATION 418, the collected data may be analyzed using one or more algorithms. For example, an NILM algorithm may be used to analyze power draw data and the energy profiles of the electric power that flows into one or more prosumer units 105 to determine whether the energy consumed by specific individual loads (e.g., appliances or devices) within the prosumer unit is balanced or can be scheduled to operate more efficiently. For example, at DECISION OPERATION 420, a determination may be made as to whether the local distribution grid 145 and/or if the prosumer unit 105a connected to the local distribution grid may be operating inefficiently. At OPERATION 422, the cause of a detected inefficiency may be determined. One example inefficiency that may be detected is an imbalanced load. For example, the imbalance may include unbalanced loads on feeder lines 304 of the local distribution grid 145 that feed various prosumer units 105.

At OPERATION 424, an action to perform to correct the detected inefficiency may be determined. For example, if inefficient usage of a particular application or device at a prosumer unit 105 may be determined (e.g., the appliance/device runs during a peak time, but could be scheduled to run during a non-peak time), a determined action may be to notify the prosumer of the inefficiency via an instruction to a home automation or home energy management system at the prosumer unit 105 or via a notification to the prosumer user/owner. As another example, if an imbalance is detected in the feeder lines 304 of the local distribution grid 145, a determined action may be to determine a balanced configuration of the feeder lines based on real time or near-real time loads on the local distribution grid 145 or based on the energy profiles of the loads on the feeder lines, and to notify the service provider or instruct one or more load balancers 302 to change the supply line of power to one or more prosumer units 105 in the local distribution grid 145. At OPERATION 426, the determined action may be performed (e.g., a notification 206 may be sent, feeder lines 304 may be balanced, an instruction may be sent to a home automation system or home energy management system).

Figure 4B:
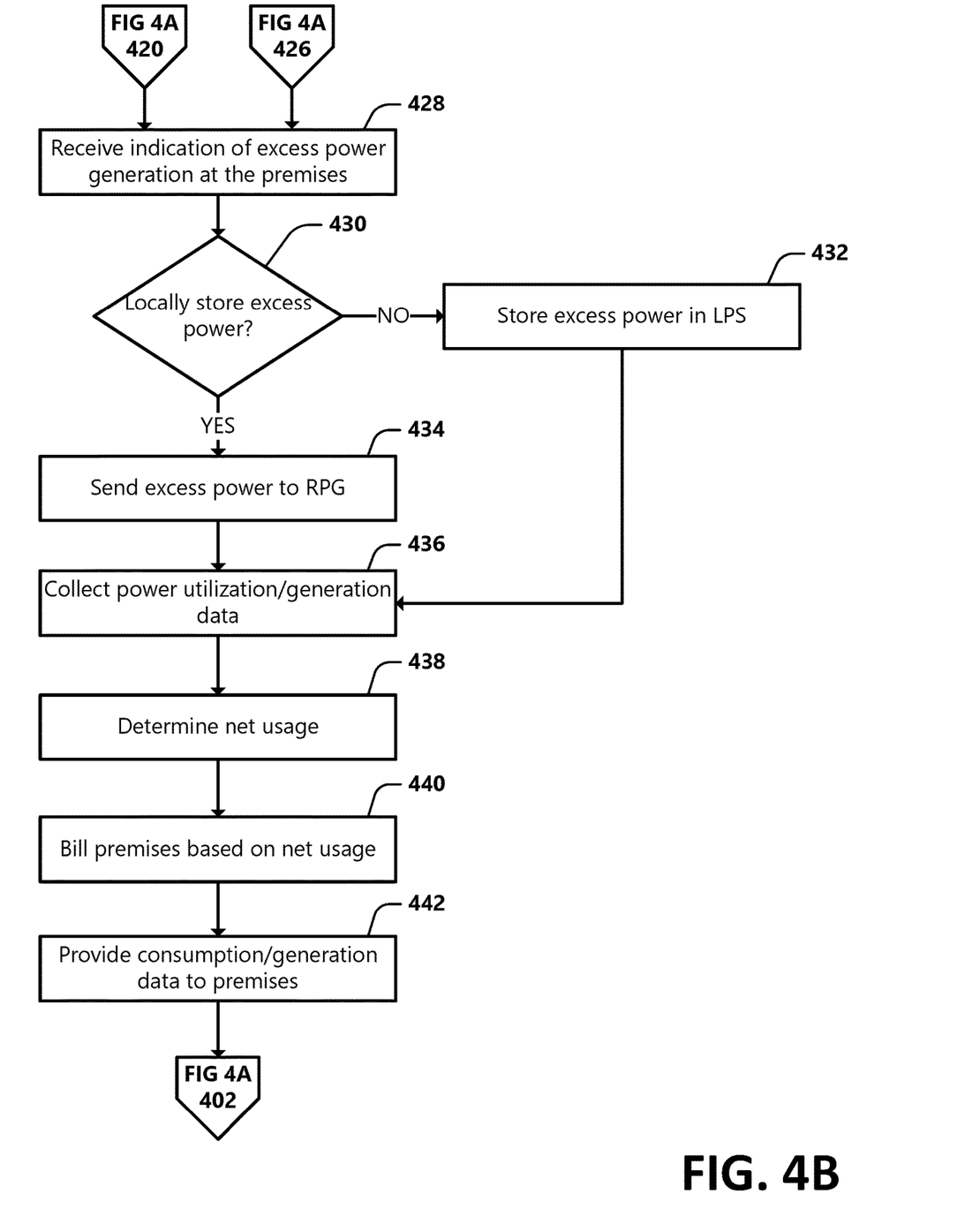

The method 400 continues to FIG. 4B, where at OPERATION 428, an indication of excess power generation at the prosumer unit 105 may be received. For example, local power-generating devices 135 at the first prosumer unit 105 may produce more power than the demand of the loads at the prosumer unit. Accordingly, the inverter 137 may feed excess power output from the local power-generating devices 135 at the first prosumer unit 105 to the local distribution grid 145.

At DECISION OPERATION 430, a determination may be made as to store excess power at the local power storage 115 or to transmit the excess power to the regional power grid 120. The determination may be based on various criteria to optimize efficiency of the local distribution grid 145, wherein optimized efficiency may be associated with minimizing costs, maximizing profits, minimizing transmission losses, maximizing utilization of locally-generated power, etc. For example, the local power manager 110 may evaluate various criteria, such as load/generation profiles, the charge level of the local power storage 115, billing rates and purchase rates of the regional power grid 120 (e.g., based on peak or off-peak periods), etc. When a determination is made to store the excess locally-generated power, at OPERATION 432, the LPS inverter 137d may receive instructions from the local power manager 110 to connect to the local distribution grid 145, and convert and store the excess power. When a determination is made to not store the excess locally-generated power, at OPERATION 434, the controller 160 may connect to the regional power grid 120 for transmitting the excess power to the regional grid.

At OPERATION 436, power utilization and generation data may be collected from various meters, such as the prosumer meter 125, the LPS meter 130, and/or the RPG meter 140, and at OPERATION 438, the data may be analyzed for determining net usage amounts of the local distribution grid 145 (e.g., difference between the amount of power received from the regional power grid 120 and the amount of power transmitted to the regional power grid) and the prosumer unit 105 (e.g., difference between amount of power the prosumer unit received from the local distribution grid 145 and the amount of power transmitted to the local distribution grid 145). Further, a billing amount may be determined for the prosumer unit 105 (and each prosumer unit connected to the local distribution grid 145). The billing amount may be based on the net usage amount and rates associated with when the power was consumed and when the power was transmitted (e.g., during peak or non-peak times). In various examples, billing amounts may further include a distribution of costs for powering shared resources in the locale (e.g., street lights, club house, community pool). At OPERATION 440, the prosumer unit 105 may be billed for the determined billing amount.

At OPERATION 442, the local power manager 110 may provide power consumption and generation information to prosumer units 105 and/or to an entity or load management system associated with the locale. For example, information may be provided in a format that can received and utilized by a home automation, home energy management system, or smart appliance/device, in a format that can be displayed on a computing device, or another format that enables the prosumer to see the prosumer unit's energy usage and generation to better conserve energy. For example, the information may include the energy impact of specific appliances or devices and prices associated with their use. The method 400 returns to OPERATION 402 for continued data collection and analysis.

Figure 5:
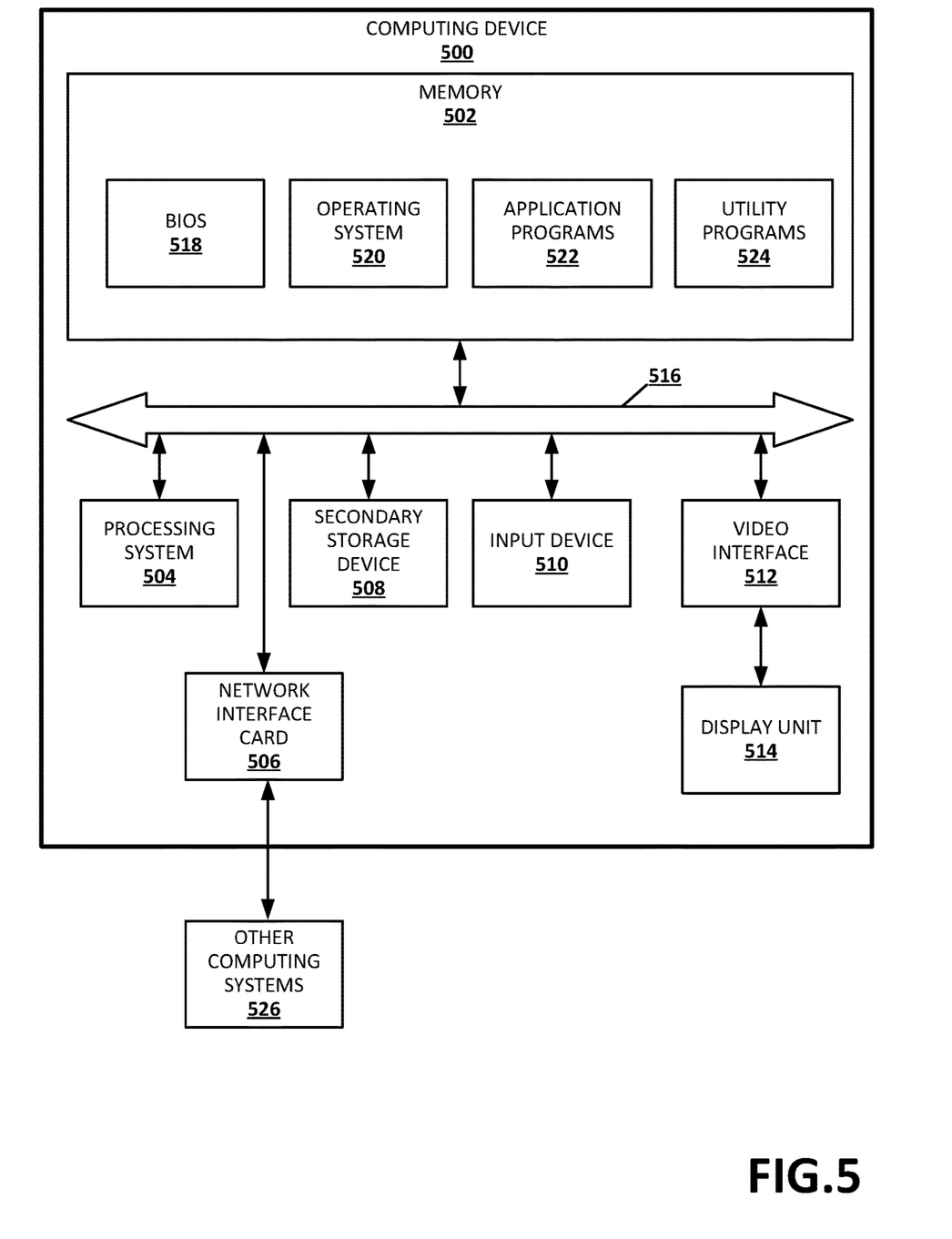
FIG. 5 is a block diagram illustrating example physical components of a computing device or system with which embodiments may be practiced.

FIG. 5 is a block diagram illustrating example physical components of a computing device or system 500 with which embodiments may be practiced. It should be appreciated that in other embodiments, different hardware components other than those illustrated in the example of FIG. 5 may be used. Computing devices may be implemented in different ways in different embodiments. For instance, in the example of FIG. 5, the computing device 500 includes a processing system 504, memory 502, a network interface 506 (wired and/or wireless), a secondary storage device 508, an input device 510, a video interface 512, a display unit 514, and a communication medium 516. In other embodiments, the computing device 500 may be implemented using more or fewer hardware components (e.g., a video interface, a display unit, or an input device) or in combination with other types of computer systems and program modules 526.

The memory 502 includes one or more computer-readable storage media capable of storing data and/or computer-executable instructions. Memory 502 may store the computer-executable instructions that, when executed by processor 504, provide the implementation of the SLPD 100 according to an embodiment. In various embodiments, the memory 502 is implemented in various ways. For example, the memory 502 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 504 includes one or more processing units, which may include tangible integrated circuits that selectively execute computer-executable instructions. In various embodiments, the processing units in the processing system 504 are implemented in various ways. For example, the processing units in the processing system 504 can be implemented as one or more processing cores. In this example, the processing system 504 can comprise one or more microprocessors. In another example, the processing system 504 can comprise one or more separate microprocessors. In yet another example embodiment, the processing system 504 can comprise Application-Specific Integrated Circuits (ASICs) that provide specific functionality. In yet another example, the processing system 504 provides specific functionality by using an ASIC and by executing computer-executable instructions.

The computing device 500 may be enabled to send data to and receive data from a communication network via a network interface card 506. In different embodiments, the network interface card 506 is implemented in different ways, such as an Ethernet interface, a token-ring network interface, a fiber optic network interface, a wireless network interface (e.g., WIFI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 508 includes one or more computer-readable storage media, and may store data and computer-executable instructions not directly accessible by the processing system 504. That is, the processing system 504 performs an I/O operation to retrieve data and/or computer-executable instructions from the secondary storage device 508. In various embodiments, the secondary storage device 508 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 510 enables the computing device 500 to receive input from a user. Example types of input devices include, but are not limited to, keyboards, mice, trackballs, stylus input devices, key pads, microphones, joysticks, touch-sensitive display screens, and other types of devices that provide user input to the computing device 500.

The video interface 512 outputs video information to the display unit 514. In different embodiments, the video interface 512 is implemented in different ways. For example, the video interface 512 is a video expansion card. In another example, the video interface 512 is integrated into a motherboard of the computing device 500. In various embodiments, the display unit 514 can be an LCD display panel, a touch-sensitive display panel, an LED screen, a projector, a cathode-ray tube display, or another type of display unit. In various embodiments, the video interface 512 communicates with the display unit 514 in various ways. For example, the video interface 512 can communicate with the display unit 514 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 516 facilitates communication among the hardware components of the computing device 500. In different embodiments, the communications medium 516 facilitates communication among different components of the computing device 500. For instance, in the example of FIG. 5, the communications medium 516 facilitates communication among the memory 502, the processing system 504, the network interface card 506, the secondary storage device 508, the input device 510, and the video interface 512. In different embodiments, the communications medium 516 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 502 stores various types of data and/or software instructions. For instance, in the example of FIG. 5, the memory 502 stores a Basic Input/Output System (BIOS) 518, and an operating system 520. The BIOS 518 includes a set of software instructions that, when executed by the processing system 504, cause the computing device 500 to boot up. The operating system 520 includes a set of software instructions that, when executed by the processing system 504, cause the computing device 500 to provide an operating system that coordinates the activities and sharing of resources of the computing device 500. The memory 502 also stores one or more application programs or program code 522 that, when executed by the processing system 504, cause the computing device 500 to provide applications to users. The memory 502 also stores one or more utility programs 524 that, when executed by the processing system 504, cause the computing device 500 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPoE), etc. including any combination thereof.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

We claim:

1. A smart local power distribution system, comprising:
a local distribution grid connected to a regional power grid by a local power manager and further connected to a plurality of power meters;
the plurality of power meters, wherein each power meter is located at a separate prosumer unit and wherein at least one of the power meters is connected to a local power-generating device at a prosumer unit; and
the local power manager comprising:
a local power storage configured to store excess power generated by the local power-generating device;
at least one processor;
a memory storage device including instructions that when executed by the at least one processor are configured to:
receive power usage data and power generation data from the plurality of power meters;
analyze the power usage data and power generation data for generating a power load profile and a power generation profile;

make a data-based power flow decision corresponding to optimized efficiency of the smart local power distribution system based at least in part on the power load profile and power generation profile; and
based on the power flow decision, control:
a flow of power from the local power storage to the local distribution grid;
a flow of power from the regional power grid to the local distribution grid;
a flow of power from the regional power grid to the local power storage;
a flow of excess power generated by the local power-generating device to the local power storage; or
a flow of excess power generated by the local power-generating device to the regional power grid.

2. The smart local power distribution system of claim 1, wherein the plurality of power meters comprise smart power meters configured to continually record and transmit power usage and power generation data to the local power manager according to a predetermined time interval.

3. The smart local power distribution system of claim 2, wherein:
in generating the power load profile and the power generation profile, the local power manager is configured to generate a power load profile and a power generation profile for each prosumer unit; and
analyze the power load profiles and the power generation profiles for determining an optimal configuration of the associated prosumer units on phases of the local distribution grid for balancing power flow in the local distribution grid for improved efficiency.

4. The smart local power distribution system of claim 3, wherein in generating the power load profile for each prosumer unit, the local power manager is configured to use non-intrusive load monitoring technology to analyze the energy profile of the power that flows into the prosumer unit for determining the power consumed by specific individual loads at the prosumer unit over time.

5. The smart local power distribution system of claim 3, wherein the local power manager is further configured to generate and provide a notification to a service provider of the local distribution grid, wherein the notification includes the determined optimal configuration.

6. The smart local power distribution system of claim 3, wherein:
the system further comprises a plurality of load balancers configured as load switching devices; and
one or more load balancers of the plurality of load balancers are configured to receive instructions from the local power manager to automatically switch a connection of one or more prosumer units from one phase to another phase based on the determined optimal configuration.

7. The smart local power distribution system of claim 1, wherein the data-based power flow decision is associated with optimizing efficiency of the system to provide at least one of:
minimized costs of purchasing power from the regional distribution grid;
maximized profits of selling excess power generated by the local power-generating device to the regional power grid;
minimized power transmission losses; and
maximized utilization of locally-generated power.

8. The smart local power distribution system of claim 7, wherein the local power manager is further configured to:
determine a charge level of the local power storage; and
use the local power storage charge level as part of making the data-based power flow decision.

9. The smart local power distribution system of claim 7, wherein the local power manager is further configured to:
obtain regional billing rates associated with the regional power grid;
obtain regional buy-back rates associated with the regional power grid; and
use the regional billing rates and regional buy-back rates as part of making the data-based power flow decision.

10. The smart local power distribution system of claim 9, wherein the local power manager is further configured to determine a billing amount for power consumed by each prosumer unit during a billing cycle, wherein the billing amount is based on:
an amount of power delivered to the premises unit from the local distribution grid and associated local billing rates based on peak or off-peak usage;
an amount of excess power delivered to the local distribution grid from the premises unit and associated local buy-back rates based on peak or off-peak usage;
an amount of power purchased from the regional power grid and delivered to the local distribution grid and associated regional billing rates based on peak or off-peak usage; and
an amount of excess power delivered to the regional power grid from the local distribution grid and associated regional buy-back rates based on peak or off-peak usage.

11. A method of providing efficient local power generation and consumption via a smart local power distribution system, the method comprising:
receiving power usage data and power generation data from a plurality of power meters, wherein each power meter is located at a separate prosumer unit and wherein at least one of the power meters is connected to a local power-generating device at a prosumer unit;
analyzing the power usage data and power generation data for generating a power load profile and a power generation profile;
receiving an indication, from a power meter of the plurality of power meters, of power consumption from a local distribution grid, wherein the local distribution grid is connected to a regional power grid by the local power manager;
determining a charge level of a local power storage connected to the local distribution grid, wherein the local power storage is configured to store excess power generated by the local power-generating device;
making a data-based power flow decision corresponding to optimized efficiency of the smart local power distribution system based at least in part on the power load profile and power generation profile and the charge level of the local power storage; and
based on the power flow decision, control at least one of:
a flow of power from the local power storage to the local distribution grid;
a flow of power from the regional power grid to the local distribution grid;
a flow of power from the regional power grid to the local power storage;
a flow of excess power generated by the local power-generating device to the local power storage; and a flow of excess power generated by the local power-generating device to the regional power grid.

12. The method of claim 11, further comprising:
generating a power load profile and a power generation profile for each prosumer unit; and
analyzing the power load profiles and the power generation profiles for determining an optimal configuration of the associated prosumer units on phases of the local distribution grid for balancing power flow in the local distribution grid for improved efficiency.

13. The method of claim 12, wherein generating the power load profile for each prosumer unit comprises using non-intrusive load monitoring technology to analyze the energy profile of the power that flows into the prosumer unit for determining the power consumed by specific individual loads at the prosumer unit over time.

14. The method of claim 13, further comprising generating and providing a notification to a service provider of the local distribution grid, wherein the notification includes the determined optimal configuration.

15. The method of claim 13, further comprising sending instruction to one or more load balancers configured as load switching devices to automatically switch a connection of one or more prosumer units from one phase to another phase based on the determined optimal configuration.

16. The method of claim 11, wherein making the data-based power flow decision corresponding to optimized efficiency of the smart local power distribution system comprises making the data-based power flow decision to provide at least one of:
minimized costs of purchasing power from the regional distribution grid;
maximized profits of selling excess power generated by the local power-generating device to the regional power grid;
minimized power transmission losses; and
maximized utilization of locally-generated power.

17. The method of claim 16, further comprising:
obtaining regional billing rates associated with the regional power grid;
obtaining regional buy-back rates associated with the regional power grid; and
using the regional billing rates and regional buy-back rates as part of making the data-based power flow decision.

18. The method of claim 17, further comprising determining a billing amount for power consumed by each prosumer unit during a billing cycle, wherein the billing amount is based on:
an amount of power delivered to the premises unit from the local distribution grid and associated local billing rates based on peak or off-peak usage;
an amount of excess power delivered to the local distribution grid from the premises unit and associated local buy-back rates based on peak or off-peak usage;
an amount of power purchased from the regional power grid and delivered to the local distribution grid and associated regional billing rates based on peak or off-peak usage; and
an amount of excess power delivered to the regional power grid from the local distribution grid and associated regional buy-back rates based on peak or off-peak usage.

19. A system for storing unused locally generated excess power on a smart local power distribution network, comprising:
a local distribution grid connected to a regional power grid by a local power manager and further connected to a plurality of power meters;
the plurality of power meters, wherein each power meter is located at a separate prosumer unit and wherein at least one of the power meters is connected to a local power-generating device at a prosumer unit; and
a local power storage configured to:
receive unused locally generated excess power from the local distribution grid;
store the unused locally generated excess power; and
receive instructions from the local power manager to supply power to the local distribution grid, wherein the instructions are associated with a data-based power flow decision corresponding to optimized efficiency of the smart local power distribution system for at least one of:
minimizing costs of purchasing power from the regional distribution grid;
maximizing profits of selling excess power generated by the local power-generating device to the regional power grid;
minimizing power transmission losses; and
maximizing utilization of locally-generated power; and
supply the stored unused locally generated excess power to the local distribution grid.

20. The system of claim 19, wherein the local power manager is configured to:
receive power usage data and power generation data from the plurality of power meters;
analyze the power usage data and power generation data for generating a power load profile and a power generation profile; and
the data-based power flow decision is based at least in part on the power load profile and power generation profile.

* * * * *